H. R. LAYNG.
PROCESS OF CYANIDING.
APPLICATION FILED MAR. 19, 1913.
1,178,081.
Patented Apr. 4, 1916.
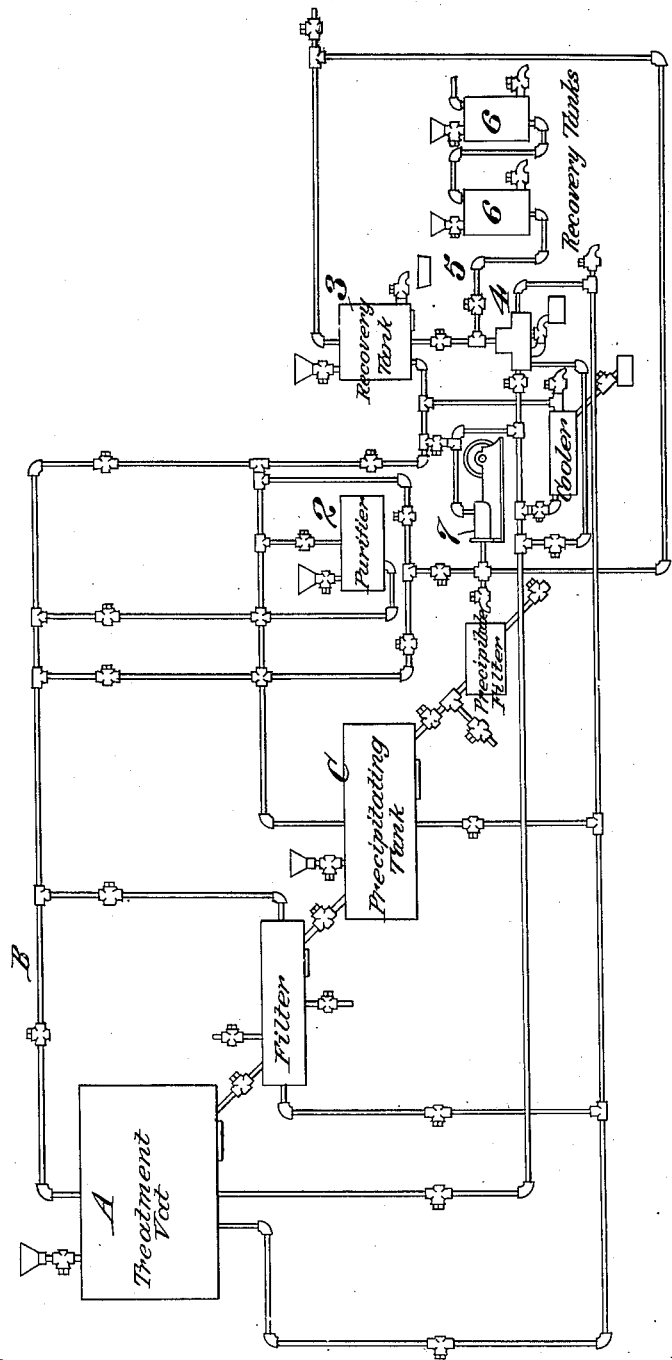
WITNESSES:
Charles Pickles
Thos Castberg
INVENTOR
Harai R. Layng
BY G. H. Strong.
ATTORNEY

UNITED STATES PATENT OFFICE.

HARAI R. LAYNG, OF SAN FRANCISCO, CALIFORNIA.

PROCESS OF CYANIDING.

1,178,081.  Specification of Letters Patent.  Patented Apr. 4, 1916.

Application filed March 19, 1913. Serial No. 755,346.

*To all whom it may concern:*

Be it known that I, HARAI R. LAYNG, a citizen of the United States, residing in the city and county of San Francisco and State of California, have invented new and useful Improvements in Processes of Cyaniding, of which the following is a specification.

This process is for the purpose of increasing the field of application of cyanidation, and also for the purpose of increasing the efficiency of cyanidation in extraction of values.

Other objects of the process are to conduct cyanidation, either wholly or in parts, within closed vessels to prevent the escape of cyanogen gases; to provide means whereby the cyanogen may be removed from the solution to cause precipitation of the metals; to provide means for recovering the cyanogen; to provide means for recovering cyanogen from waste materials, such as residual ores, waste solution, etc.; and also to provide means by which ores or other substances may be advantageously treated for the extraction of values, such as gold, silver, copper, etc., by treating the ore with the most suitable class of cyanid solution.

Further objects will hereinafter appear.

Having reference to the accompanying drawing—the drawing is a diagrammatic view of the apparatus employed.

The following is a description of the most common causes of loss of cyanid (by "cyanid" is meant any cyanogen compound capable of dissolving values from ores, such as NaCN, $Ca(CN)_2$, $NH_4CN$ and HCN). Among these causes may be mentioned:—

*Loss #1.*—Cyanids when in contact with water, or with acids, such as the mineral acids like $H_2SO_4$, etc., or with other acids, chemicals, or compounds, or organic acids like $CO_2$, etc., decompose into HCN, which (HCN,) being or possessing the nature of a gas at ordinary temperatures and under ordinary conditions, has heretofore passed off from the appliances pertaining to cyanidation and escaped to the atmosphere and has consequently been lost or consumed.

The mineral acids mentioned are usually formed during cyanidation by the decomposition, oxidization or change of the elements or compounds contained in the ore or other matter which is being cyanided. The organic acids, such as $CO_2$ and the like, are sometimes contained in the ore or matter, but are more often contained in the air which is much used in cyanidation for the purpose of agitating mixtures of ground ore and cyanid solution and for other well-known purposes.

The loss due to the decomposition of cyanid into HCN, and also the loss due to the volatile nature of some cyanogen compounds, such as $NH_4CN$, are variable in extent and sometimes may amount to, in practical cases, over ten per cent. of the total cyanid lost or consumed in the application of cyanid processes.

The following equations illustrate how some of the decompositions of cyanid may take place:

1. $2KCN + H_2SO_4 = 2HCN + K_2SO_4$,
2. $2KCN + CO_2 + H_2O = 2HCN + K_2CO_3$,
3. $Ca(CN)_2 + CO_2 + H_2O = 2HCN + CaCO_3$,
4. $KCN + 2H + O = HCN + KOH$ (due to hydrolysis greatly increased by heat),
5. $2NH_4CN + H_2SO_4 = 2(NH_4)_2SO_4 + 2HCN.$

*Loss #2.*—Cyanid combines with many elements in many forms. The loss of cyanid due to the formation of simple, double or complex cyanids, such as for example $Zn(CN)_2$, $KAg(CN)_2$, is great, and when Au or Ag ores, etc., contain elements other than Au or Ag, or compounds having injurious effects on cyanid, the loss or consumption of cyanid has been, or would be, in the case of such ores much greater than in the case of simple Au or Ag ores. In many cases this greater consumption of cyanid has heretofore prohibited the commercially profitable application of cyanid processes or methods of extracting and recovering the precious metals from ores or other matter on account of or due to the high cost of the cyanid so lost or consumed. As cyanid has in the past only been used in the majority of cases for the purpose of extracting precious metals from ores, etc., other elements, or compounds of the same, such as for example Cu, Sb, As, S, Te, etc., contained in such ores have been harmful because they combined with cyanid or the cyanogen contained therein and thereby rendered the cyanid so combined unavailable for use in extracting the precious metals.

The following equations illustrate some of these losses:

1. $2Ag + 4KCN + H_2O + O = 2KAg(CN) + 2KOH$,
2. $2Cu + 8KCN + H_2O + O = 6KCN + Cu(CN) + 2KOH$,
3. $KCN + Se = KSeCN$.

*Loss #3.*—This loss is due to the discarding or wasting of surplus or accumulated solutions and to cyanids discarded in the residual ores, etc.

*Loss #4.*—In the operation of cyanid plants, solutions accumulate, due to moisture in ores, washings and other well-known reasons, to such an extent that it is unprofitable or impractical, or perhaps impossible, to build or supply sufficient storage capacity for such accumulating solutions, so, therefore, it becomes necessary to discard or waste some of such solutions. In most of such cases the weaker solutions are discarded in order to make storage capacity for stronger solutions which are more desirable for the purpose of extracting the precious metals from such matters as contain them than are the weaker solutions. The discarded solutions usually carry values (Au, Ag, or other elements) to the extent of some cents per ton of solution, which (said values) could not heretofore in many cases be profitably recovered from such solutions. The monetary loss due to the wasting or discarding of such solutions has heretofore been a great one. Probably ten per cent. more or less of the cyanid heretofore consumed or lost in many plants has been due to the discarding of such mentioned solutions and to the discarding of cyanid contained in the residues.

In some, if not many, cyanid plants, solutions which have been used for some time become fouled with chemicals or compounds. Solutions so fouled have less of a selective action for dissolving Au or Ag, etc., than have freshly prepared solutions. In many such plants the monetary gain, due to increase in extraction of Au or Ag., etc., which is due, as aforesaid, to the use of freshly prepared solutions, is so great that in such cases it is more profitable to discard some, if not all, of the old or fouled solutions, in order to make room for, or in order to permit freshly prepared solutions to be used, than it is to use fouled solutions. As it has been explained that it is more profitable to discard the older or fouled solutions than to work with them, it must also be remembered that the discarding of the fouled solutions entails a considerable loss of cyanid. (It may herein be explained that some foul solutions do not satisfactorily yield their dissolved values to the methods of precipitation which are now in common use, so, therefore, a loss of dissolved values is also effected), but such a loss of cyanid in such cases is monetarily less than the monetary gain due to the use of freshly prepared solutions.

A further loss which has not hereinbefore been mentioned and which is due partly to Losses #3 and #4 is the loss due to poisoned streams or ponds with cyanid which has caused severe loss of life to cattle, fish and other living creatures.

In the practical application of the cyanid process, the loss referred to as Loss #1 is prevented in some cases to some extent by adding to the cyanid solutions a protecting alkali, such as CaO or other alkalis, but as may be proved in many cases the additions of such protecting alkalis as they are performed in practice do not completely prevent the loss of cyanid as described.

A solution to which a protecting alkali has been added in excess is termed a "protected alkaline cyanid solution." A solution to which no excess of protecting alkali has been added, or a solution to which an acid has been added and which contains free HCN is termed an "acid cyanid solution." A solution containing ammonium cyanid in considerable amounts is termed an "ammonium cyanid solution."

In some cases a protected alkaline cyanid solution is less effective and slower in its action of dissolving Au from ores, etc., than is an acid cyanid solution, and in many cases a protected alkaline cyanid solution acts for that reason as well as for other chemical or other reasons more rapidly and more completely upon the heretofore undesired elements, such as Cu, thereby causing a greater loss of cyanid for said reason than does the acid cyanid solution; but on the other hand the consumption of cyanid in the case of an acid cyanid solution, due to the volatile nature of HCN, has been considerably greater in some cases of the acid cyanid solution than has the loss of cyanid due to any cause in some cases of the protected alkaline cyanid solution. So, therefore, some of the advantages which could have been gained by the use of an acid cyanid solution have heretofore in most cases been overbalanced by the lesser consumption of cyanid found in some cases of the protected alkaline cyanid solution; so, consequently, the protected alkaline cyanid solution has in such cases heretofore been proved to be more profitable from the commercial point of view than has the acid cyanid solution. Experience has shown that protected alkaline cyanid solutions have more of a tendency to foul, that is, take up copper and other harmful elements or compounds, than have acid cyanid solutions. It may be mentioned that some acid cyanid solutions do not satisfactorily yield their values to ordinary methods of precipitation, and that in such cases it is necessary to neutralize them with alkalis before they will yield their values to zinc precipitation method.

It has been proven in practice that moderately heated solutions in quite a number of cases have been and are more advantageous in the extraction of metals from ores than are cold solutions, but the loss mentioned as Loss #1 has heretofore been greater with moderately heated solutions than with cold solutions. Excessive heating of cyanid solutions causes considerable loss of cyanid. This is especially true in the case of ammonium cyanid solutions. The method advocated for use for precipitating and recovering the dissolved values from ammonium cyanid solutions was in most cases essentially a heating method, such as boiling the solution or injecting hot steam into the solution. Such procedures would probably cause such high temperatures that considerable of the cyanid would be converted into other organic chemicals which would not be of any use as a solvent for the metals, such as Au, Ag, Cu, etc. Therefore, such cyanid as would have been so converted would have been lost or consumed. This great probable loss of cyanid plus the high cost of boiling the solutions, etc., has thus far prevented ammonium cyanid from being used with any marked degree of success in practical application. Ammonium cyanid solutions are in some cases more advantageous for extraction purposes for recovering metals, such as Au, Ag, Cu, etc., from ores or other matter than are either protected alkaline cyanid solutions, other than those protected with $NH_3$, or acid cyanid solutions; but, as before stated, the said losses have heretofore prevented to a great extent the adaptation of ammonium cyanid as a solvent for the values contained in ores.

The foregoing has shown that there are three general forms or classes of either heated or cooled, or strong or weak cyanid solutions, namely:—1. Protected alkaline cyanid solutions, 2. Acid cyanid solutions, 3. Ammonium cyanid solutions.

While three general forms of cyanid solutions have been named, I wish it understood that cyanid solutions may, and do in some instances contain mixtures of cyanids, such as cyanids of the alkaline metals, ammonium cyanid and acid cyanids, such as HCH. Each of these has certain advantages over the others and each has had heretofore its disadvantages or defects.

In order to overcome or to remedy to a great extent the mentioned, or other too numerous to mention, disadvantages or defects, I have invented a process and devices pertaining to such process, which process is so elastic in its use that it may be successfully applied either wholly or in part in order to meet and fulfil its requirements by any particular case without its otherwise being materially changed in nature or purpose. Thus it is that by the application of my invention many ores or other matter may be more advantageously treated by cyanidation than they have heretofore been treated, and many ores or other matter which have not heretofore been successfully treated by cyanidation may now be treated successfully; and, further, ores, etc., may now by the use of this invention be treated by whatever cyanid solution is the most advantageous for extraction without incurring the great losses mentioned herein, and the values, such as gold, silver, copper, and the like, as well as the cyanogen, may be recovered from such solutions. This said recovery of values and cyanogen in practise may be more complete in most cases than heretofore, and the said recovery of values will in many cases prove more advantageous than heretofore. Furthermore, ores containing copper or other elements, as well as with or without Au or Ag, may be treated profitably by cyanidation and the copper may be recovered in many cases profitably, and nearly all of the cyanid which has heretofore been consumed can be recovered.

In general practice considerable cyanid is generally lost through volatilization of gaseous cyanids, such as for example HCN, $NH_4CN$, etc., or decomposition of the solid cyanids, such as for example KCN, into gaseous cyanids during some if not all of the various steps of cyanidation of the ores or other substances; the cyanids escaping in a gaseous form to the atmosphere and being entirely lost. This loss varies and may amount to ten per cent. and in some cases considerably more than ten per cent. of the cyanid consumed in cyanidation.

In order to recover the cyanid which has heretofore been lost, through volatilization or decomposition, in cyanidation, the following process is employed: Referring to the drawing, the cyanidation, or steps thereof, is carried on in closed or sealed vats or devices A, which are connected by a pipe B and a suitable pump or equivalent means, if necessary, for propelling the gases, with a series of purifying tanks 2, if necessary, for removing impurities, and absorbers 3; the contents and number of the various purifying and absorbing tanks varying according to the nature of the gas, or gases, and local conditions.

As before stated, there are three general forms of cyanid solutions which may be used in cyanidation; first, the protected alkaline cyanid solutions; second, acid cyanid solutions; and third, ammonium cyanid solutions. The contents of the purifying and absorbing devices vary according to the nature of the solution and local conditions, and in some instances the purifying medium may be entirely eliminated.

In case there are but small amounts or no impurities present, such as for example $H_2S$, $CO_2$, and where local conditions permit, a gas, such as for example HCN, may be absorbed (that is the cyanogen contained in such gas), by placing an alkaline absorbent or absorbents, such as sodium hydrate and calcium oxid, and the like, preferably in the form of a solution or held in suspension in a solution, within the absorbent chambers to recover the cyanid. The hydrocyanic acid contained in such gas and the like will thus combine with the absorbent and form cyanid, as will be seen by the following examples:

$$HCN + KOH = KCN + H_2O,$$
$$2HCN + CaO = Ca(CN)_2 + H^2O.$$

The cyanid may be drawn from the recovery devices and re-used for the further extraction of values from ores.

The gases liberated when treating ores with acid cyanid solutions, ammonium cyanid solutions, or protected alkaline cyanid solutions, are generally HCN and are, therefore, treated and absorbed as just described. In cases where sufficient impurities are present and similar gases liberated, together with the HCN, it becomes necessary in cases where the absorbent is not suitable to take care of the impurities, and in cases where the impurity is present in sufficient amounts to make it worth while to use the purifier, to first pass the gases through the purifier containing suitable chemicals to absorb or remove the impurities. This then leaves the gases free from harmful impurities to be absorbed by the alkaline absorbents placed in the following absorbing chamber 3. For instance, if the impurity is S, as in $H_2S$, the purifying chemical in that case may be a lead salt, etc. For example:—

$$PbO + H_2S = PbS + H_2O.$$

In instances where the gases contain an impurity, such as for example $CO_2$, which would affect an alkaline absorbent, such as CaO, it becomes necessary in most cases to use an absorbent other than an alkali, excepting, however, in some cases magnesium oxid. There are many known absorbents which can be used and from which cyanid may be recovered, as for instance zinc hydrate. In case $CO_2$ is present in considerable quantity and zinc hydrate is the absorbent used, the HCN will combine with the zinc hydrate to form zinc cyanid and water according to the following equation:

$$2HCN + Zn(OH)_2 = Zn(CN)_2 + 2H_2O.$$

The zinc cyanid is insoluble as far as this process is concerned.

The zinc cyanid may be removed from the absorbing chamber and together with sufficient water placed in the boiling device, indicated at 4, which is connected by means of a suitable connection 5 with a secondary recovery device 6 containing an alkali, etc. The boiling device is then sealed and the contents heated to boiling, which boiling causes the cyanogen contained in the zinc cyanid to combine with the hydrogen contained in the water and forms HCN thereby. The HCN on continued boiling may be removed and the removal of the HCN from the boiling device may be aided, if desired, by the means of passing air or other suitable gas through the boiling mixture contained in the boiling device. Zinc hydrate will be left in the boiling device from where it may be removed for further use. The HCN when generated or liberated is conveyed through pipe 5 to the absorbing chamber 6.

In the chamber 6 the HCN combines with the absorbent, preferably an alkali, etc., to form a cyanid which may be drawn from the device, when necessary or when required, and added to water to form fresh cyanid solutions, if desired, or otherwise used. The heat used for the boiling process may be generated during the process for making $CO_2$, which is one of the chemicals which may be used in any process for converting cyanids into HCN. $CO_2$ is produced by the combustion of suitable carbonaceous materials in oxygen or air, for instance burning coal in air.

In case the gases liberated during cyanidation contain other gas, such as for example ammonium cyanid, the ammonium cyanid may be recovered instead of by absorption by means of a cooling process. This is accomplished by passing the gases through a suitable compressor and cooler, indicated at 7, where the gases are reduced to a sufficiently low temperature to precipitate the ammonium cyanid, thus leaving this in highly available form for future use. If any gases escaping from the compressor and cooler, indicated at 7, still contain cyanogen, it is only necessary to pass these through the absorbing chamber indicated at 3, where the cyanogen contained will thus be absorbed and the remaining gas allowed to escape or otherwise utilized.

The metal or cyanogen bearing solution resulting from such treatment of ores, etc., after having passed through the different devices, such as treatment vats, filters, canals, etc., or sealed devices A, is finally conveyed to an inclosed tank, indicated at C, for the purpose of removing and recovering the cyanids and also for the purpose of precipitating salts of the metals contained in solution. This is accomplished by adding suitable chemicals, such as for example $H_2SO_4$, HCl, $CO_2$, $H_2S$, $Na_2S$, CaS and others, the nature and amount of which and the proper time for their addition may be determined by a laboratory chemist, or others, by simple tests or analysis of the solution or material which is to be treated, to the solution which will convert the combined cyanogen contained in the solution to a gaseous form which may be removed by forcing or otherwise conducting air or other suitable gas through the solution. The cyanogen gas thus removed is then conveyed to the purifiers and absorbers and recovered, as before stated, being recovered by the different absorbents described, the absorbent varying according to the condition of purity of the gas or gases.
The addition of the chemicals, together with the removal of the cyanid, causes a more or less complete precipitation of the metals, such as gold, silver, copper, and the like in the form of salts thereof, which may be removed at any advantageous step of the process by a filter or like device, where the solid is separated from the remaining solution and treated in the usual manner while the solution may be run to waste, or in cases where water is scarce it may be returned to a sump or storage tank where it may be chemically treated for purification, if necessary, and further used.

In treating ores with any of the common cyanid processes now most generally used, it is known that considerable of the cyanid contained in the solution is lost through volatilization during the treatment of the ore in the dissolving vats, filters, precipitating devices, etc., the gases thus liberated generally escaping to the atmosphere. It can thus be easily seen that this loss may be practically eliminated by inclosing the treatment devices, thus making it possible to collect and convey the gases liberated during treatment to a suitable recovery device to recover the cyanids. I wish it understood that I do not wish to limit myself to the precipitating process here described, as it is obvious that any of the well-known zinc precipitating methods may be employed.

In carrying out the above process on solutions it will be found that many of the elements, such as Au, Ag, Cu, or others dissolved from the ore, etc., by the solution, or contained in the solution, will have been precipitated. Due to the fact that Au, and possibly some compounds of Au and perhaps other elements, are soluble in some HCN solutions, the precipitation of such elements from cyanid solutions is not wholly performed in the above process until almost all of the cyanogen compounds which are capable of dissolving such elements have been nearly completely removed from the solution, or unless possibly an excess of a reducing reagent, like $H_2S$, is added, which latter procedure would probably prove costly. With this process such cyanogen compounds are so completely removed, and, therefore, the precipitation of such elements, etc., is practically complete. In this process the solvent may be removed from the solution before all of the precipitate is removed from the solution by mechanical means. This process will effect as complete a precipitation of certain elements, such as for example Au or Ag, from solutions very weak in cyanid as from very strong cyanid solutions. In this respect it has a great advantage over the methods heretofore in successful general use. Zinc processes have been proved to be very poor precipitating processes in the case of very weak cyanid solutions. In many cases cyanid is added to weak cyanid solutions in order to aid precipitation by the zinc methods.

I wish it understood that the solution conveyed to the precipitating tank C may consist of any of the before-mentioned solutions, such as protected alkaline solution, ammonium cyanid solution, or acid cyanid solution, and that the solution may be treated by means of the addition of whatever chemicals are necessary for the purpose of converting the cyanogen contained in the solution into a suitable gas, and then removing the cyanogen bearing gas by means of passing air or other suitable gas or gases through the solution which causes practically a complete precipitation of the values which may be contained in such solution, and then recovering the cyanogen gases by means of cooling or absorption. By separating the solution from the solid precipitate and retaining the said precipitate, the solution may be treated for the recovery of the cyanogen and values or either by passing it through the various steps of the process previously described. For instance, a solution producing a gas like ammonium cyanogen gas would have its gas passed through the compression and cooling step of the process indicated at 7 for the recovery of the ammonium cyanid, while solutions producing a cyanogen gas, which may be absorbed by an alkaline absorbent or other suitable absorbent, are simply passed through the absorbing chambers indicated at 3, for the recovery of cyanogen. However, the moment the cyanogen gas is combined or associated with sufficient impurities to be harmful to the process, it becomes necessary to pass the gas through a suitable purifying medium contained in the purifier 2, from which the purified cyanogen bearing gas may be passed through the absorbing chambers 3 for the recovery of the cyanogen, etc., unless the impurity is such that it can be cared for by means of absorbents contained in the absorption chamber. In that case no purifying device is necessary.

In instances where absorbents other than alkalis or like absorbents are used, such as for example zinc hydrate, it will be understood that the cyanogen gas is absorbed to form a compound which may be easily recovered and from which cyanid may be easily recovered either by passing it through the boiling step of the process indicated at 4, or by other suitable means. Cyanid may be recovered from other CN bearing substances by the foregoing means.

In cyanidation it is well-known that considerable cyanid has heretofore been lost due to the discarding of residual ores or other matter containing cyanogen. The cyanid thus contained may be removed by placing the residual ore, etc., in an inclosed chamber where it is given suitable chemical treatment for the purpose of converting the cyanid into gas which is then removed and conveyed, as before described, to the purifiers or absorbers for absorption, or to the cooler for recovery, leaving the residue practically free from cyanid. For instance, residual ores contained in a suitable filter and which contain potassium cyanid may be relieved of their potassium cyanid by simply passing air or other suitable gas containing a suitable chemical, such as a substance having an acid action, for instance, $CO_2$ through the residual ore, and thence conveying the air, etc., through the absorption system, etc. $CO_2$ decomposes cyanids, such as $Ca(CN)_2$ and the like, according to the following equation:

$$Ca(CN)_2 + CO + H_2O = 2HCN + CaCO_3.$$

With this process the treated ores do not require washing with water in order to remove contained cyanids as the cyanids can be removed by the herein disclosed process. This is quite an advantage over other processes as it will not cause that excessive accumulation of solutions, due to washing the treated ore with water, and it will allow ores to be treated with the most suitable form of cyanid solutions until the solutions are recovered from the ores by the ordinary means, without additions of water washes, by means of utilizing this process to recover cyanid from the residual ores. This would cause an increase in efficiency of existing cyanid plants and would reduce the amount of costly solution storage capacity which is ordinarily required. Thus with this process quite strong cyanid solutions could be used without encountering the danger of losing cyanid which would be encountered in ordinary cyanidation. The poisoning of streams may be prevented by removing the poisonous cyanids from solutions or other products before they are discarded.

By referring to the foregoing description, it can easily be seen that it is possible both from a financial and practical standpoint to treat an ore by the most suitable class of cyanid solution, as the losses, and sometimes prohibitive losses, generally encountered are practically overcome by the use of this process.

I also wish it understood that the air or other permissible gases used during different steps of the process may be returned in a closed circuit. This prevents the loss of certain chemicals, such as the alkaline absorbents, $CO_2$, $H_2S$, and possibly some cyanid. In cases where the solution or other matter contains gaseous chemicals, or easily volatile cyanids, such as $NH_3$, $NH_4CN$, it will in most cases prove profitable to remove such gases by air or other permissible gases before adding other chemicals, such as $H_2SO_4$ and HCl, thus producing a saving of such chemicals.

The cyanogen contained in the cyanids, which cyanogen does not already possess a gaseous nature and which is contained in solution or other matter, may be converted into HCN by means of different chemicals. The following are examples of same:

The addition of a sufficient amount of acid, preferably a very slight excess, causes a more or less complete decomposition of the cyanid causing HCN to be formed.

Examples:

1. $2KCN + H_2SO_4 = K_2SO_4 + 2HCN$,
2. $NaCN + HCl = NaCl \times HCN$,
3. $Ca(CN)_2 + H_2SO_4 = CaSO_4 + 2HCN$,
4. $Ca(CN)_2 + CO_2 + H_2O =$
$$CaCO_3 + 2HCN,$$
5. $2(NH_4CN) + H_2SO_4 =$
$$(NH_4)_2SO_4 + 2HCN.$$

This causes a partial decomposition of combined cyanids, such as $KAg(CN)_2$ and others, causing some HCN to be formed.

Example:

$$KAg(CN)_2 + H_2SO_4 = 2AgCN + 2HCN + K_2SO_4.$$

The simple cyanids, such as for example AgCN, are relieved from their CN by the addition of a suitable chemical, which, in the case of AgCN, could be $H_2S$ or other suitable chemical. For example:—

$$2AgCN \times H_2S = Ag_2S + 2HCN.$$

It will be seen from the foregoing that the cyanid and cyanid compounds may be broken up and their CN may be converted into HCN. Knowledge and experience have shown that many, if not quite all, CN bearing compounds may be converted or broken up into other forms and the CN liberated will form HCN, by treating them with suitable chemicals. The following equations will illustrate the manner in which some of the important CN compounds resulting from cyanidation deliver or yield their CN in wet reactions, as HCN—

1. $(Na_2Zn(CN)_4+Na_2S)=ZnS+4NaCN$, $4NaCN+2H_2SO_4=2Na_2SO_4+4HCN$.

2. (a) Oxidizers will in the presence of $H_2SO_4$ decompose sulfo-cyanids into HCN, etc.

(b) By passing an electric current through an $H_2SO_4$ solution containing sulfo-cyanids, the sulfo-cyanid is decomposed into HCN, etc.

(c) The S may be removed from sulfo-cyanids by oxidizing the S with a suitable salt.

A. $5KCNS+6KMnO_4+4H_2SO_4=$
   $5KCN+6MnSO_4+3K_2SO_4+4H_2O$,
   $5KCN+5HCl=5KCl\times 5HCN$,

B. $HCNS+O_3+H_2O=H_2SO_4+HCN$.

The proper passing of air or other permissible gas or gases through solution or other matter will remove other gases or easily volatile chemicals as are contained therein, such as HCN, $NH_4CN$, $NH_3$, etc., from such solutions, etc., as effectively as will the proper application of heat, such as boiling solutions, etc., air having the advantage over heat processes, such as boiling, due to its lower cost and its harmlessness. Numerous practical experiments made with this process have proved that the passing of air, etc., through the charge will remove the HCN, etc., almost completely, if not completely, and sucessfully. Other cyanids, such as KCN, may be removed from solution, etc., by simply passing air, etc., through the solution, etc.

The following equations will illustrate some of the reactions which may take place in the absorption device:

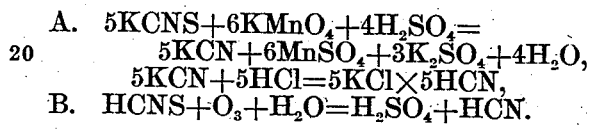

1. $HCN+NaOH=NaCN+H_2O$,
2. $2HCN+Ca(OH)_2=Ca(CN)_2+2H_2O$,
3. $2HCN+Zn(OH)_2=Zn(CN)_2+2H_2O$,
4. $2HCN+MgCO_3=$
   $Mg(CN)_2+H_2O+CO_2$.

It will have been seen from the foregoing that the metals, such as Au, Ag, Cu, etc., can be precipitated and that they can easily be recovered; that the cyanid is removed from the original solution; and that it is subsequently recovered in an available form. Practical laboratory tests of this process, made on upward of two hundred pounds of solution, have resulted in about 100 per cent. recovery or regeneration of cyanid and 100 per cent. precipitation of the value, such as Au and Ag, at a low cost, and these tests have shown that this process can be profitably and advantageously applied in practice. Therefore, by the application of this process cyanidation is rendered more useful for the purpose of extracting Au or Ag from rebellious ores, or ordinary ores, and cyanidation is cheapened thereby. It also renders cyanidation useful for the purpose of profitably extracting and recovering metals other then Au or Ag, such as Cu, from ores, etc. This is possible because the cyanid used for that purpose is regenerated. Precipitation, as well as general cyanidation, can be effected with this process with less loss of cyanid or combined cyanids than with any other known process.

Perhaps in many cases, due to the high cost of mineral acids and the like and to other possible reasons, it may be found that the decomposition of the cyanid, such as KCN, $Ca(CN)_2$, and the like, and perhaps the decomposition of other CN compounds, together with the precipitation carried on thereby, may be more profitably effected by using, instead of the mineral acid and the like, an organic acid or acids, such as $CO_2$, for the purpose of either partially or wholly replacing the mineral acid and the like. Heat, provided it is not great enough to be harmful, aids the removal of the CN bearing gases, etc., from solutions, etc., by means of passing air, etc., through such solutions, etc.

I wish it understood that the term "escaping cyanids" referred to is any cyanogen matter which would, if allowed, escape during any steps of cyanidation to the atmosphere. Such matters as HCN, $NH_4CN$, and the like, may be "escaping cyanids".

In operation the following example is given showing the use of all steps of the process: The ore containing sulfid and carbonates and gold, silver and copper is prepared in the usual manner and treated in sealed devices A with cyanid solution containing $NH_4CN$, KCN and HCN; air or any other suitable means being used to agitate the mixture. The sulfids are oxidized to sulfates, these sulfates attacking the alkaline cyanids and causing HCN to be liberated. HCNS is formed during the treatment. HCN, and $NH_4CN$ being volatile escape from the mixture, together with air and $CO_2$. These gases are prevented from escaping to the atmosphere until cyanid is recovered because of the sealed devices A.

The gases are conveyed from the sealed devices A to a purifying device containing suitable chemical to purify the HCNS. The purified gases are conveyed to the compressor wherein they are suitably compressed. The compressed gases are cooled to ordinary temperatures, if necessary, then they are allowed to suitably expand in a suitable device. This expansion of the compressed gases produces cold which causes the $NH_4CN$ contained in the gases to precipitate from the gases in a highly available form (usually a solid form) which may be recovered from the device and treated as desired. The gases now free from $NH_4CN$ and still containing, besides the air and $CO_2$, some HCN, are conducted through the absorption devices containing $Zn(OH)_2$. The HCN combines with $Zn(OH)_2$ to form water and $Zn(CN)_2$ which remains in the absorption chamber, while the air and $CO_2$ pass through the absorption chamber and are either used over or they are allowed to escape to the atmosphere. The $Zn(CN)_2$ and $H_2O$ remaining in the absorption chamber are removed from the same, when desired, and are placed in a boiling device and are boiled until the $Zn(CN)_2$ and $H_2O$ are converted into HCN and $Zn(OH)_2$. The boiling is continued and may be aided if desired by passing air through the mixture until the HCN is driven from the boiling device, from which it is conducted to the secondary absorption device containing KOH. In the absorption device the HCN combines with the KOH forming KCN (cyanid) and water which may be drawn from the secondary recovery device and added to more water to form fresh solution, or it may be otherwise used as desired. (It may be herein explained that if the degree of cold produced in the cooling device is sufficiently low, it will cause HCN to precipitate from the gases, but it should be understood that power costs will rarely permit this method of recovering HCN to be used in place of the absorption methods.)

When the ore has been subjected to treatment with the cyanid solutions for a sufficient length of time to extract the desired values, the solutions are separated from the ore by means of a filter press, it being understood that the dissolved values are removed from the ore by means of washes. It is also understood that the ore which is being treated in this case was not treated with cyanid solutions in such devices as filter presses or leaching tanks, etc., as in these cases the treatment of ore with cyanid solution would result in a separation of the solution from the ore; nevertheless in these cases the resulting solution would be treated as will be treated the solutions in this example. The solution so separated is placed in a sealed treatment device and air is forced through the solution to remove the volatile cyanid as $NH_4CN$, HCN, etc. These are conducted from the sealed treatment device and are recovered as similar gases which were escaping during ore treatment were recovered, but in this case as no impurities are shown, the purifier may be passed by and the gases may be conducted directly to the recovery steps. When gases such as $NH_4CN$, which would, if present, cause needless consumption of $H_2SO_4$, the acid to be used in this example, have been removed, $H_2SO_4$ and $Na_2S$ are added to the solution. The addition of these chemicals causes the cyanogen combined with the K, Ag, Cu and Au to be converted into HCN which is then removed from the solution by means of air and is recovered as HCN was recovered in the case of gases escaping during treatment of the ore, excepting, however, that in this case the gases may contain $H_2S$ which will be removed in the purifier by means of a salt like lead acetate.

The addition of chemicals to the solution will have caused the values, as Au, Ag and Cu to precipitate, but as some of the so precipitated values are soluble to some extent in the HCN solution, it will have been found that precipitation is not practically complete until the HCN has been removed from the solution, or unless, possibly, an excess of the reducing reagent as $Na_2S$ has been added. The values so precipitated from the solution are separated from the solution by means of a filter and treated as desired, while the solution now practically free from cyanogen may be treated as desired.

The residual ore, that is the ore remaining in the filter press after the solution has been separated from it, usually contains moisture which contains cyanid, so, therefore, the ore in the filter press is treated by means of passing $CO_2$, or air containing $CO_2$ or other suitable chemicals, through it. This causes the cyanid contained in the residual ore to be removed therefrom in the form of a gas. These gases are treated, as before described, for the purpose of recovering cyanid.

Having thus described my invention, what I claim and desire to secure by Letters Patent is—

1. A method of extracting values from ores and recovering cyanid from its solution which consists in first treating the ores with a cyanid solution, then filtering the solution to remove the undissolved residue, conveying the pregnant solution to a sealed receptacle, adding a chemical to liberate cyanid and to precipitate salts of the metals, conveying the liberated cyanid to a recovery device to recover the cyanid, and filtering the remaining solution to recover the precipitated salts.

2. A method of extracting values from ores and recovering cyanid from its solution which consists in first treating the ores with a cyanid solution, then filtering the solution to remove the undissolved residue, conveying the filtered solution to a sealed receptacle, adding a chemical to liberate cyanid and also to precipitate salts of the metals, removing the liberated cyanid by passing gaseous fluid through the solution, and filtering the remaining solution to recover the precipitated salts.

3. A method of extracting values from ores and recovering cyanid from its solution which consists in first treating the ores with a cyanid solution, then filtering the solution to remove the undissolved residue, conveying the filtered solution to a sealed receptacle, adding a chemical to liberate cyanid and also to precipitate salts of the metals, removing the liberated cyanid by passing gaseous fluid through the solution, conducting the liberated cyanid to an absorption chamber to recover the cyanid, and filtering the remaining solution to recover the precipitated salts.

4. The process of obtaining substantially pure hydrocyanic acid from a mixture containing the same which comprises contacting said mixture with a solid substance which will combine with said acid and readily liberate it again when the combination is heated in the presence of water, and then heating the resulting compound in the presence of water to produce hydrocyanic acid.

5. The process of obtaining substantially pure hydrocyanic acid from a gaseous mixture containing the same which comprises contacting said mixture with zinc hydroxid, mixing the resulting zinc cyanid with water and boiling the mixture to produce and drive off hydrocyanic acid.

6. A method of recovering cyanid from solution or other matter which consists in treating the solution or other matter with a chemical to remove cyanid as a gaseous cyanid, and purifying the removed gaseous cyanid by conducting it to an absorption chamber containing a suitable absorbent to recover cyanogen from the gaseous cyanid, treating the cyanogen compound therein produced in a boiling device with water, boiling the mixture to drive off the cyanogen as HCN, and conducting the HCN to a secondary absorption chamber containing alkaline absorbents to recover the cyanid.

7. A method of recovering cyanid from residual ores containing the same resulting from cyanidation which consists in passing gases containing a substance having an acid action through the residual ores in order to liberate and remove cyanid, and recovering the cyanid so removed by contacting it with a binding agent therefor.

8. A method of recovering cyanids from residual ores containing the same which comprises chemically treating the residual ores to produce a gas mixture containing hydrocyanic acid, and then separating said acid from the mixture.

In testimony whereof I have hereunto set my hand in the presence of two subscribing witnesses.

HARAI R. LAYNG.

Witnesses:
JOHN H. HERRING,
W. W. HEALEY.